United States Patent
Martinez et al.

(10) Patent No.: US 12,152,416 B2
(45) Date of Patent: Nov. 26, 2024

(54) LIFTGATE LATCH

(71) Applicant: Inteva Products, LLC, Troy, MI (US)

(72) Inventors: Alfredo Martinez, Ciudad Juarez (MX); Eduardo Estrada, Ciudad Juarez (MX); Francisco Vazquez, Ciudad Juarez (MX); Donald M. Perkins, Sterling Heights, MI (US)

(73) Assignee: INTEVA PRODUCTS, LLC, Troy, MI (US)

( * ) Notice: Subject to any disclaimer, the term of this patent is extended or adjusted under 35 U.S.C. 154(b) by 993 days.

(21) Appl. No.: 15/710,522

(22) Filed: Sep. 20, 2017

(65) Prior Publication Data

US 2018/0087294 A1 Mar. 29, 2018

Related U.S. Application Data

(60) Provisional application No. 62/398,761, filed on Sep. 23, 2016.

(51) Int. Cl.
| | |
|---|---|
| *E05B 81/14* | (2014.01) |
| *B60J 5/10* | (2006.01) |
| *E05B 81/06* | (2014.01) |
| *E05B 81/20* | (2014.01) |
| *E05B 81/30* | (2014.01) |

(Continued)

(52) U.S. Cl.
CPC .............. *E05B 81/14* (2013.01); *E05B 81/30* (2013.01); *E05B 81/34* (2013.01); *E05B 81/68* (2013.01);

(Continued)

(58) Field of Classification Search
CPC .......... E05B 81/14; E05B 81/30; E05B 81/34; E05B 81/68; E05B 81/90; E05B 83/18;

(Continued)

(56) References Cited

U.S. PATENT DOCUMENTS

| | | | |
|---|---|---|---|
| 5,639,130 A | 6/1997 | Rogers, Jr. et al. | |
| 6,471,259 B1 * | 10/2002 | Weyerstall | E05B 81/14 |
| | | | 292/201 |

(Continued)

FOREIGN PATENT DOCUMENTS

| | | |
|---|---|---|
| CN | 201874351 U | 6/2011 |
| DE | 10231825 A1 | 4/2004 |

(Continued)

OTHER PUBLICATIONS

European Patent Office, Extended European Search Report for Application No. 17192655.3-1005, issued Feb. 1, 2018 (6 pp.).

(Continued)

*Primary Examiner* — Christine M Mills
*Assistant Examiner* — Yahya Sidky
(74) *Attorney, Agent, or Firm* — CANTOR COLBURN LLP

(57) ABSTRACT

A latch includes a housing, a fork bolt, and a detent lever. The fork bolt is coupled to the housing and is movable between an unlatched position, a primary latched position, and a secondary latched position. The detent lever is operably coupled to the housing and is arranged to cooperate with the fork bolt. A drive link is operatively connected to the fork bolt and to the detent lever. The drive link is movable in a first direction to engage the detent lever to open the latch and is movable in a second direction to engage the fork bolt to cinch the latch.

14 Claims, 6 Drawing Sheets

(51) Int. Cl.
    *E05B 81/34*     (2014.01)
    *E05B 81/68*     (2014.01)
    *E05B 81/90*     (2014.01)
    *E05B 83/18*     (2014.01)

(52) U.S. Cl.
    CPC .............. *E05B 81/90* (2013.01); *E05B 83/18* (2013.01); *B60J 5/107* (2013.01); *E05B 81/06* (2013.01); *E05B 81/20* (2013.01); *E05Y 2900/546* (2013.01)

(58) Field of Classification Search
    CPC .... E05B 81/06; E05B 81/20; Y10T 292/1082; Y10T 292/1047; Y10S 292/23; Y10S 292/42; Y10S 292/43; B60J 5/107; E05Y 2900/546
    See application file for complete search history.

(56) References Cited

U.S. PATENT DOCUMENTS

| | | | | |
|---|---|---|---|---|
| 7,059,640 | B2 * | 6/2006 | Tensing | E05B 81/14 292/201 |
| 8,303,003 | B2 * | 11/2012 | Berghahn | E05B 81/14 292/201 |
| 2012/0091740 | A1 * | 4/2012 | Chevalier | E05B 81/14 292/226 |
| 2013/0300133 | A1 * | 11/2013 | Margheritti | E05B 77/34 292/100 |

FOREIGN PATENT DOCUMENTS

| | | |
|---|---|---|
| GB | 2320943 A | 7/1998 |
| WO | 03006769 A1 | 1/2003 |
| WO | 2010067074 A1 | 6/2010 |
| WO | 2011052540 A1 | 5/2011 |

OTHER PUBLICATIONS

Second Office Action; Chinese Application No. 201710290186.2; International Filing Date: Sep. 21, 2017; Date of Mailing: Jan. 13, 2021; 16 pages.

Chinese Third Office Action; Chinese Application No. 201710290186.2; Date: May 11, 2021; 17 pages.

Chinese Search Report; Chinese Application No. 2017108633881; Date: May 27, 2020; 3 pages.

\* cited by examiner

LIFTGATE LATCH

CROSS-REFERENCE TO RELATED APPLICATIONS

This application claims the benefit of 62/398,761, filed Sep. 23, 2016, which is incorporated herein by reference in its entirety.

TECHNICAL FIELD

Exemplary embodiments of the present invention relate generally to door, lift gate, glass window and movable panel latches and, more particularly, to latches for vehicles.

BACKGROUND

Certain passenger vehicles are equipped with a rear vehicle storage compartment, commonly known as a trunk. The trunk is closed by a deck lid that is hinged to the vehicle body and swings open to provide access to the storage compartment. Similarly, other vehicles are equipped with a lift gate that allows access to the rear of the vehicle through a gate that is hinged at or near the roof line of a vehicle and opens upward. Other vehicles have sliding doors that run horizontally on a track between an opened and closed position. Each of the deck lid, lift gate or sliding door can be thought of as panels that allow access to the interior of the vehicle compartment. Compartment latches, enable each of these types of panels to be secured and closed.

Latches may be configured to perform both a power release function and a power cinching function. During a cinching operation, a cinching motor commonly moves a gear transmission that in turn rotates the forkbolt. During a release operation, a release mechanism rotates the detent position allowing the forkbolt to rotate open. The same motor may be configured to perform both the power release and the power cinching function; however such configurations typically include a multitude of structural components, which vary between latch applications.

Accordingly, while existing vehicle latch mechanisms are suitable, the need for improvement remains, particularly in providing a compactly packaged latch assembly having a reduced number of components such that a single motor is configured to perform both a power release and power cinching operation.

SUMMARY OF THE INVENTION

In accordance with an embodiment, a latch includes a housing, a fork bolt, and a detent lever. The fork bolt is coupled to the housing and is movable between an unlatched position, a primary latched position, and a secondary latched position. The detent lever is operably coupled to the housing and is arranged to cooperate with the fork bolt. A drive link is operatively connected to the fork bolt and to the detent lever. The drive link is movable in a first direction to engage the detent lever to open the latch and is movable in a second direction to engage the fork bolt to cinch the latch.

In addition to one or more of the features described above, or as an alternative, in further embodiments comprising an automatic mechanism operably coupled to the drive link. Operation of the automatic mechanism in a first mode moves the drive link in the first direction and operation of the automatic mechanism in a second mode moves the drive link in the second direction.

In addition to one or more of the features described above, or as an alternative, in further embodiments an end of the drive link is positioned generally adjacent the detent lever and as the drive link moves in the first direction the end of the drive link engages and rotates the detent lever out of contact with the fork bolt to open the latch.

In addition to one or more of the features described above, or as an alternative, in further embodiments a tooth extends from a central portion of the drive link and as the drive link moves in the second direction the tooth engages and rotates the fork bolt to a primary closed position.

In addition to one or more of the features described above, or as an alternative, in further embodiments comprising a manual release lever mounted in overlapping arrangement with the drive link.

In addition to one or more of the features described above, or as an alternative, in further embodiments the manual release lever is pivotally mounted to the housing and as the manual release lever rotates, the manual release lever engages and rotates the detent lever out of contact with the fork bolt to open the latch.

In addition to one or more of the features described above, or as an alternative, in further embodiments a biasing mechanism biases the manual release lever to a default position.

In addition to one or more of the features described above, or as an alternative, in further embodiments the drive link includes a guide pin that cooperates with an adjacent surface.

In addition to one or more of the features described above, or as an alternative, in further embodiments the adjacent surface is formed in the housing.

In addition to one or more of the features described above, or as an alternative, in further embodiments engagement between the guide pin and the surface defines a path of travel of the drive link when the drive link is moved in at least one of the first direction and the second direction.

In addition to one or more of the features described above, or as an alternative, in further embodiments comprising a switch. The detent lever is rotatable to contact the switch to indicate that the detent lever is not fully engaged in a primary position or a secondary position.

In accordance with another embodiment, a method of operating a latch includes providing a drive link operably coupled with a fork bolt and a detent lever of the latch. The drive link is moved in a first direction to engage the detent lever and open the latch and the drive link is moved in a second direction to engage the fork bolt to cinch the latch closed.

In addition to one or more of the features described above, or as an alternative, in further embodiments an automatic mechanism is operably coupled to the drive link and operation of the automatic mechanism results in movement of the drive link in one of the first direction and the second direction.

In addition to one or more of the features described above, or as an alternative, in further embodiments moving the drive link in the first direction causes an end of the drive link to rotate the detent lever out of contact with the fork bolt to open the latch.

In addition to one or more of the features described above, or as an alternative, in further embodiments moving the drive link in the second direction causes a tooth extending from the drive link to rotate the fork bolt to a primary closed position.

In addition to one or more of the features described above, or as an alternative, in further embodiments moving the drive link in at least one of the first direction and the second direction includes sliding a guide pin of the drive link along an adjacent surface to move the drive link along a predetermined path.

In addition to one or more of the features described above, or as an alternative, in further embodiments the adjacent surface is formed in a housing of the latch.

In addition to one or more of the features described above, or as an alternative, in further embodiments the adjacent surface is defined by a manual release lever mounted in overlapping arrangement with the drive link The above-described and other features and advantages of the present invention will be appreciated and understood by those skilled in the art from the following detailed description, drawings, and appended claims.

BRIEF DESCRIPTION OF THE DRAWINGS

Embodiments of the present invention will now be described, by way of example only, with reference to the accompanying drawings in which.

Although the drawings represent varied embodiments and features of the present invention, the drawings are not necessarily to scale and certain features may be exaggerated in order to illustrate and explain exemplary embodiments the present invention. The exemplification set forth herein illustrates several aspects of the invention, in one form, and such exemplification is not to be construed as limiting the scope of the invention in any manner.

DETAILED DESCRIPTION

Figure 1:
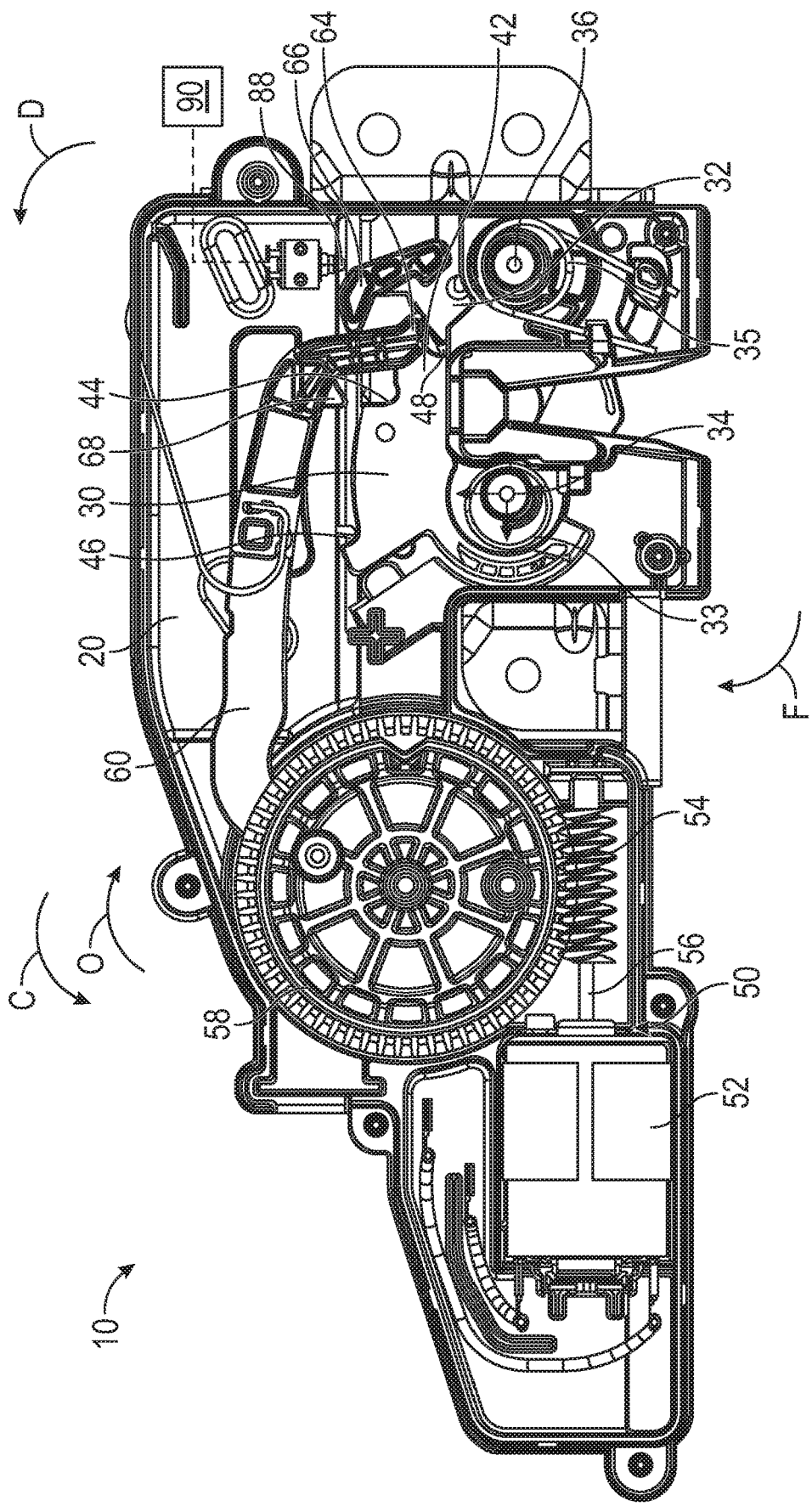
FIG. 1 is a front view of a latch according to an embodiment.
Figure 2:
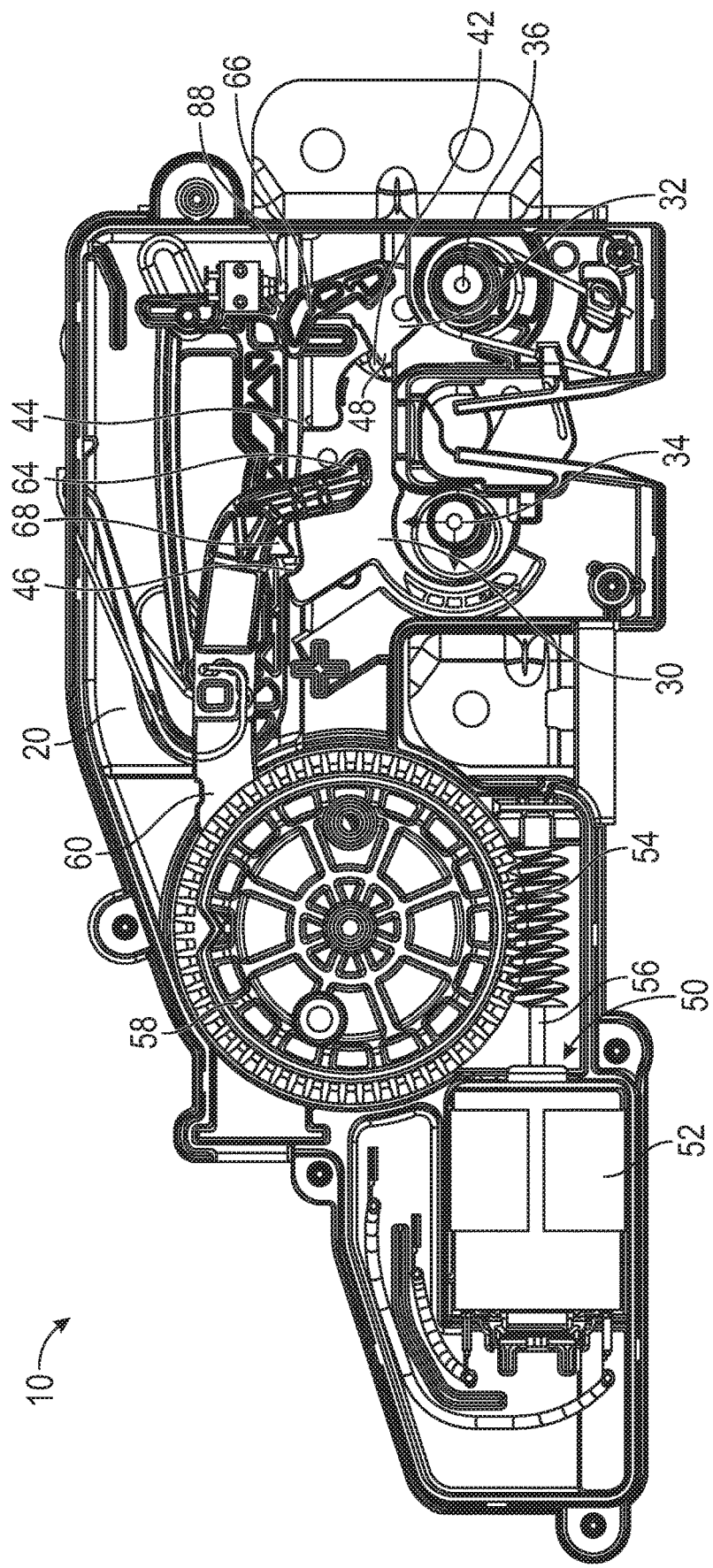
FIG. 2 is a front view of a latch after a cinching operation according to an embodiment.

Referring now to FIGS. 1 and 2, an example of a latch 10 is illustrated. The latch 10 is movable between at least one latched position (FIG. 1) and an unlatched position (not shown) and is arranged within a housing 20. The latch 10 may be integrated into a component of a vehicle, such as the vehicle structure adjacent a lift gate, trunk, door, or any other operable component for example.

Figure 3:
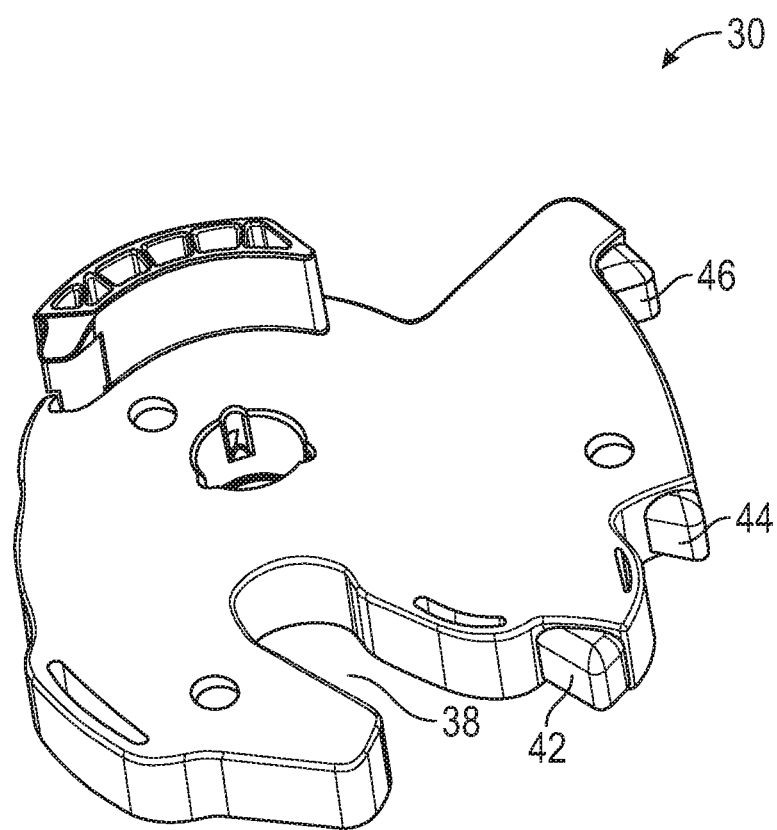
FIG. 3 is a perspective view of a fork bolt of the latch according to an embodiment.

The latch 10 includes a fork bolt 30, also commonly referred to as a claw, and a cooperating detent lever or pawl 32 for maintaining the fork bolt 30 in the latched position. Each of the fork bolt 30 and the detent lever 32 are pivotally mounted to the housing 20 of the latch 10 by a stud or pin 34, 36 respectively. The fork bolt 30 may be biased in the direction of arrow F by a first biasing mechanism 33, and the detent lever 32 may be biased in the direction of arrow D, into engagement with the fork bolt 30, by a second biasing mechanism 35. In an embodiment, the first and second biasing mechanisms may be torsion springs. The fork bolt 30, best shown in FIG. 3, has a slot or throat 38 for receiving and retaining a striker (not shown), such as a wire-loop striker for example, located on a complementary vehicle component, such as a lift gate for example.

In the illustrated, non-limiting embodiment, the fork bolt 30 includes a primary shoulder 42, a secondary shoulder 44, and a cinching shoulder 46. However, embodiments where the fork bolt 30 includes a plurality of additional shoulders are also within the scope of the disclosure. The primary shoulder 42 of the fork bolt 30 is configured to contact a corresponding surface of the detent lever 32 when rotating between an unlatched and a latched position. The detent lever 32 includes a sector-shaped catch 48 configured to positively engage the primary shoulder 42 (in a primary position), or alternatively, the secondary shoulder 44 (in a secondary position) to hold the fork bolt 30 against the bias of the first biasing mechanism 33.

The latch 10 additionally includes an automatic mechanism 50 operable not only to open the latch, but also to cinch the latch closed. The automatic mechanism 50 includes a motor 52 having a worm 54 coupled to the motor shaft 56. The worm 54 is engaged with and configured to drive rotation of an adjacent worm gear 58, such as a rotary gear for example, about an axis. The automatic mechanism 50 illustrated and described herein is intended as an example only and other mechanisms, including other gear train configurations, are considered within the scope of the disclosure.

Figure 4:
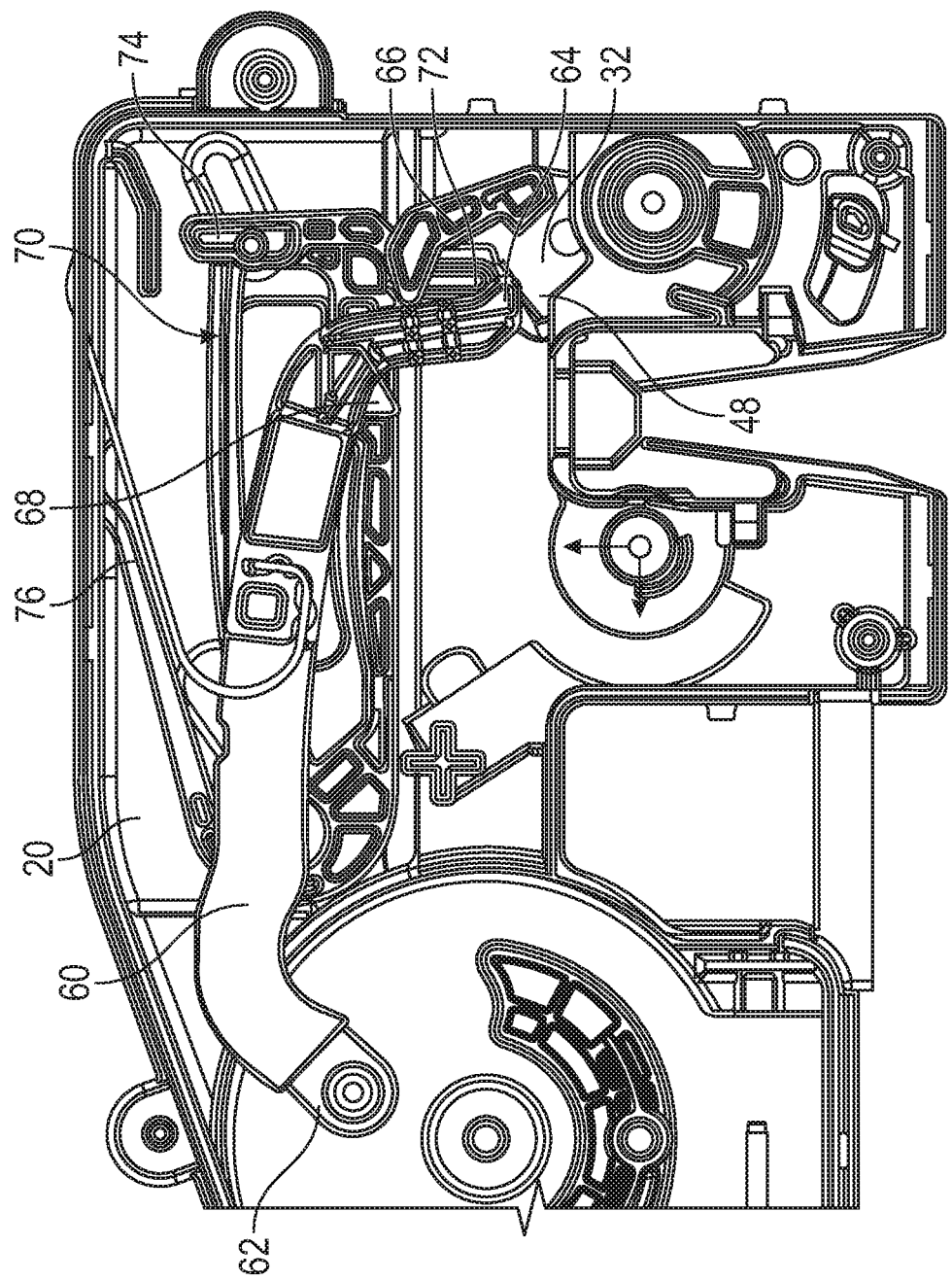
FIG. 4 is a detailed front view of a portion of the latch illustrated in FIG. 1, according to an embodiment.
Figure 5:
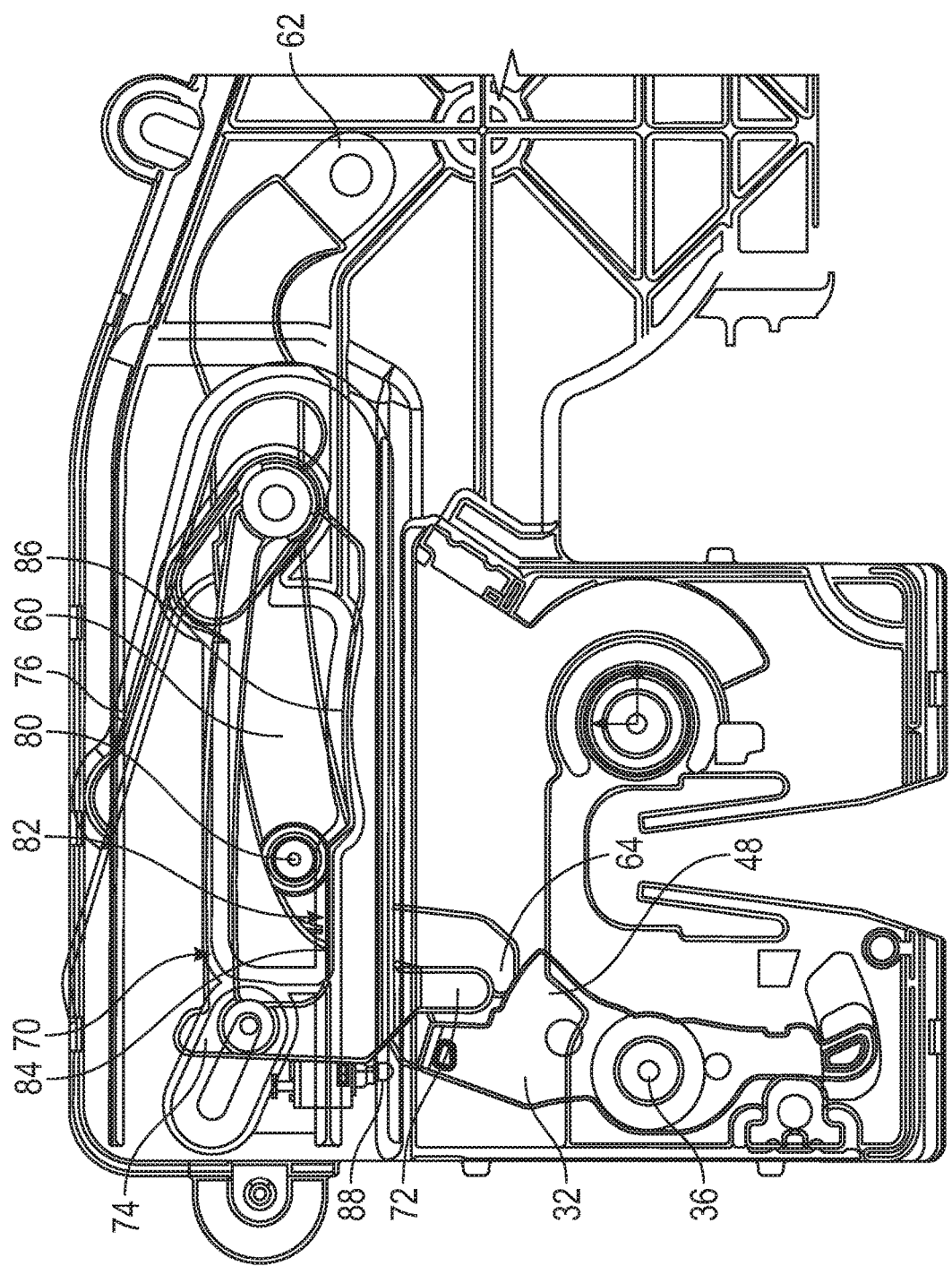
FIG. 5 is a detailed back view of the portion of the latch illustrated in FIG. 4, according to an embodiment.
Figure 6:
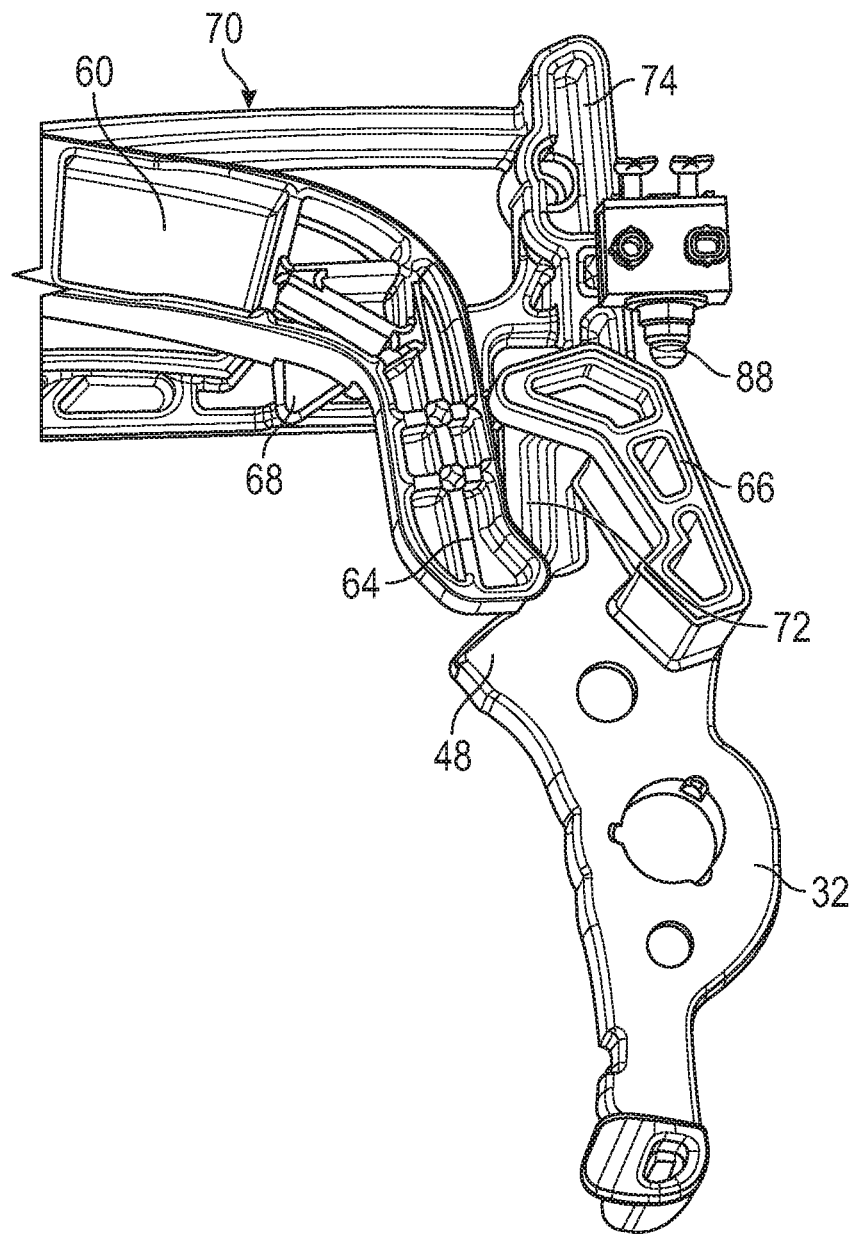
FIG. 6 is a detailed front view of a switch of the latch according to an embodiment.

A drive link 60 is movably mounted within the housing 20. A first end 62 of the drive link 60, as best shown in FIGS. 4 and 5, is connected to the rotary gear 58. The second opposite end 64 of the drive link 60 includes a hook configured to cooperate with an adjacent portion 66 of the detent lever 32. The portion 66 of the detent lever 32 may, but need not be, arranged in a plane offset from the sector-shaped catch 48. The drive link 60 additionally includes a catch or tooth 68 arranged at a central portion of the drive link 60 and extending in a direction towards the fork bolt 30.

Mounted in overlapping arrangement with the drive link 60, between the drive link 60 and the housing 20 is a manual release lever 70. The manual release lever 70 extends generally parallel to the drive link 60 such that a foot 72 arranged at an end 74 of the manual release lever 70 is positioned generally adjacent the detent lever 32. The manual release lever 70 is slidable relative to the housing 20 and includes an arm 76 extending in a direction generally away from the drive link 60. The arm 76 is configured to contact an adjacent component, such as the housing 20 for example, to bias the manual release lever 70 to a default position, shown in FIG. 5.

As best shown in FIG. 5, a guide pin 80 extending from the drive link 60, such as at a position generally adjacent the tooth 68 for example, is arranged adjacent a surface 82 of the housing 20. The surface 82 of the housing 20 is configured to cooperate with the guide pin 80 of the drive link 60 to facilitate movement of the drive link 60 along a predetermined path. The surface 82 is configured such that the drive link 60 will not interfere with rotation of the fork bolt 30 about its axis. In an embodiment, the surface 82 includes a first, generally horizontal portion 84, and a second cam-like portion 86. Although the surface 82 is illustrated and described as being formed in the housing 20, it should be understood that the surface 82 may be formed in another adjacent component, such as the manual release lever 70 for example.

In the illustrated, non-limiting embodiment, the contour of the portion of the manual release lever 70 adjacent the surface 82 is designed to avoid interference with movement of the guide pin 80 along the path defined by surface 82 when the manual release lever 70 is in its biased position.

For example, the contour of the manual release lever 70 may, but need not be similar to the contour of surface 82.

In an embodiment, the automatic mechanism 50 drives the worm gear 58 in a first direction to open the latch 10. For example, as the worm gear 58 rotates about an axis in a first direction, indicated by arrow O, the drive link 60 moves relative to the manual release lever 70. The movement of the first end 62 of the drive link 60 causes the drive link to pivot about the guide pin 80 as the guide pin 80 slides along the first portion 84 of surface 82 towards the first end 74 of the manual release lever 70. As the drive link 60 rotates, the hook disposed at the second end 64 of the drive link 60 engages the adjacent portion 66 of the detent lever 32, thereby applying a rotational force to the detent lever 32 in a direction opposite the direction indicated by arrow D. As a result, the biasing force of the first biasing mechanism 33 causes the fork bolt 30 to rotate in the direction indicated by arrow F, to release a striker from within the throat 38.

A switch 88 capable of generating a signal may be positioned adjacent the detent lever 32. In an embodiment, the switch 88 may be operatively coupled to a controller or microcontroller 90 (illustrated schematically) of a vehicle that the latch 10 is used in. Thus, the switch 88 can provide a signal to the controller or microcontroller 90. Application of a force to the detent lever 32 in a direction opposite its biasing force, causes the detent lever 32 to rotate away from the fork bolt 30 such that the protrusion 66 of the detent lever contact the switch 88. In an embodiment, the switch 88 is configured to send a signal to the controller to indicate when the detent lever 32 is not fully engaged in a primary position or secondary position.

When the latch 10 is partially closed, such as when the sector-shaped catch 48 of the detent lever 32 is engaged with the secondary shoulder 44 of the fork bolt 30, the automatic mechanism 50 may be operated to cinch the latch 10 closed. In such embodiments, the worm gear 58 is rotated about its axis in a second direction, indicated by arrow C. Rotation of worm gear 58 causes a corresponding movement of the drive link 60 relative to the manual release lever 70. As the drive link 60 moves, the guide pin 80 slides along the second portion 86 of the surface 82 of the housing 20. The contour of the cam-like second surface 86 causes the drive link 60 to translate to a position where the tooth 68 is generally aligned with the cinching shoulder 46. Further rotation of the rotary gear 58 causes the drive link 60 to engage and apply a rotational force to the fork bolt 30, in a direction opposite the biasing force, via the engagement between the tooth 68 and cinching shoulder 46. Accordingly, the rotational force causes the fork bolt 30 to rotate about its axis until the sector-shaped catch 48 engages the primary shoulder 42 of the fork bolt 30, thereby retaining the latch 10 in a closed position.

In addition, the latch 10 may be manually released via the manual release lever 70. Rotation of the manual release lever 70 relative to the housing 20 causes the foot 72 arranged at the first end 74 to contact and engage an adjacent portion of the detent lever 32. The foot applies a rotational force to the detent lever 32 in a direction opposite the direction indicated by arrow D. As a result, the biasing force of the first biasing mechanism causes the fork bolt 30 to rotate in the direction indicated by arrow F, to release the striker from within the throat 38. The rotation of the manual release lever 70 causes a similar rotation of the drive link 60. As the manual release lever 70 rotates, the surface thereof contacts and applies a force to the drive link 60 via the guide pin 80. The engagement between the surface and the guide pin causes the drive link to pivot to a position that does not interfere with the fork bolt 30.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A latch comprising:
   a housing;
   an automatic mechanism;
   a fork bolt operably coupled to the housing and pivotal between an unlatched position, a primary latched position, and a secondary latched position;
   a detent lever operably coupled to the housing and arranged to cooperate with the fork bolt; and
   an elongate drive link having a first end operably coupled to the automatic mechanism and a second, opposite end, the drive link being operatively connected to the fork bolt and to the detent lever, the drive link being movable in a first direction to engage the detent lever to open the latch, the drive link being movable in a second direction to engage the fork bolt to cinch the latch, wherein the drive link includes a first portion arranged adjacent the first second end of the drive link and a second portion, distinct from the first portion and located at a central portion of the drive link between the first end and the second, opposite end, the first portion being operable to engage the detent lever and the second portion being operable to engage the fork bolt; and
   a guide pin extending from the drive link, wherein the guide pin is arranged in contact with a first portion of a surface formed in the housing during movement of the drive link in the first direction and is arranged in contact with a second portion of the surface formed in the housing during movement of the drive link in the second direction.

2. The latch according to claim 1, wherein operation of the automatic mechanism in a first mode moves the drive link in the first direction and operation of the automatic mechanism in a second mode moves the drive link in the second direction.

3. The latch according to claim 1, wherein the first portion of the drive link is positioned generally adjacent to the detent lever and as the drive link moves in the first direction, the second end of the drive link engages and rotates the detent lever out of contact with the fork bolt to open the latch.

4. The latch according to claim 1, wherein the second portion includes a tooth and as the drive link moves in the second direction the tooth engages and rotates the fork bolt to the primary latched position.

5. The latch according to claim 1, further comprising a manual release lever mounted in overlapping arrangement with the drive link.

6. The latch according to claim 5, wherein the manual release lever is pivotally mounted to the housing and as the manual release lever rotates, the manual release lever engages and rotates the detent lever out of contact with the fork bolt to open the latch.

7. The latch according to claim 6, wherein a biasing mechanism biases the manual release lever to a default position.

8. The latch according to claim 1, wherein engagement between the guide pin and the surface formed in the housing defines a path of travel of the drive link when the drive link is moved in at least one of the first direction and the second direction.

9. The latch according to claim 1, further comprising a switch, wherein the detent lever is rotatable to contact the switch to indicate that the detent lever is not fully engaged in a primary position or a secondary position.

10. A method of operating a latch comprising:
providing a drive link having a first end operably coupled to an automatic mechanism and a second, opposite end, the drive link being operably coupled with a fork bolt and a detent lever of the latch, the drive link having a first portion arranged adjacent to the first-second end of the drive link and a second portion distinct from the first portion and located at a central portion of the drive link between the first end and the second, opposite end;
moving the drive link in a first direction, via the second end, to contact the detent lever with the first portion of the drive link and open the latch; and
moving the drive link in a second direction to engage the fork bolt with the second portion of the drive link to cinch the latch closed;
wherein the drive link includes a guide pin, and the guide pin is arranged in contact with a first portion of a surface formed in a housing containing the drive link, fork bolt, and detent lever during movement of the drive link in the first direction and the guide pin is arranged in contact with a second portion of the surface formed in the housing during movement of the drive link in the second direction.

11. The method according to claim 10, wherein an automatic mechanism is operably coupled to the drive link and operation of the automatic mechanism results in movement of the drive link in one of the first direction and the second direction.

12. The method according to claim 10, wherein moving the drive link in the first direction causes the second end of the drive link to rotate the detent lever out of contact with the fork bolt to open the latch.

13. The method according to claim 10, wherein the second portion of the drive link includes a tooth extending from a body of the drive link and moving the drive link in the second direction causes the tooth extending from the drive link to rotate the fork bolt to a primary closed position.

14. The method according to claim 10, wherein moving the drive link in at least one of the first direction and the second direction includes sliding the guide pin along the surface formed in the housing to move the drive link along a predetermined path.

* * * * *